US012786547B2

(12) United States Patent
Fujimoto et al.

(10) Patent No.: US 12,786,547 B2
(45) Date of Patent: Nov. 3, 2026

(54) CONTROL METHOD AND COMPUTER-READABLE STORAGE MEDIUM

(71) Applicant: ARKRAY, Inc., Kyoto (JP)

(72) Inventors: Koji Fujimoto, Kyoto (JP); Yurino Hosokawa, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 105 days.

(21) Appl. No.: 18/923,109

(22) Filed: Oct. 22, 2024

(65) Prior Publication Data

US 2025/0142196 A1 May 1, 2025

(30) Foreign Application Priority Data

Oct. 31, 2023 (JP) ................................. 2023-186986

(51) Int. Cl.
*H04N 23/61* (2023.01)
*G06T 7/20* (2017.01)

(52) U.S. Cl.
CPC ............... *H04N 23/61* (2023.01); *G06T 7/20* (2013.01)

(58) Field of Classification Search
CPC ........... H04N 23/61; G06T 7/20; G06T 7/246; G01N 33/493
See application file for complete search history.

(56) References Cited

U.S. PATENT DOCUMENTS 4,338,024 A * 7/1982 Bolz .................... G01N 15/147 356/246
4,612,614 A * 9/1986 Deindoerfer ......... G01N 15/147 702/29
2003/0123551 A1* 7/2003 Kim ..................... H04N 19/503 375/E7.263
2013/0050254 A1* 2/2013 Tran ..................... H04N 19/103 345/629
2018/0216155 A1* 8/2018 Son ......................... C40B 30/06
2021/0398296 A1* 12/2021 Fang ....................... G06T 7/215

FOREIGN PATENT DOCUMENTS

JP H0989752 A * 4/1997
JP 4085297 B2 * 5/2008
WO WO-2009125678 A1 * 10/2009 ........... G01N 15/147

OTHER PUBLICATIONS

Extended European Search Report issued in EP 24 20 9199.9-1001 by the European Patent Office on Apr. 4, 2025, which is related to U.S. Appl. No. 18/923,109.
"Urinary sediment analysis;" Medical Tests; Japanese Association of Medical Technologists; vol. 66 (2017), No. J-STAGE-1, pp. 18-50.

* cited by examiner

*Primary Examiner* — Timothy J Henn
(74) *Attorney, Agent, or Firm* — Studebaker Brackett PLLC

(57) ABSTRACT

A urine component analyzer: captures an image of a urine sample with video and stores the image of the urine sample captured as video in a storage device in cases in which movement of a material component has been detected from plural still images captured as a time series of a urine sample by an imaging device; and stores an image of the urine sample captured as a still image in the storage device without capturing an image of the urine sample with video in cases in which a movement of a material component has not been detected from the still images.

14 Claims, 11 Drawing Sheets

CONTROL METHOD AND COMPUTER-READABLE STORAGE MEDIUM

CROSS-REFERENCE TO RELATED APPLICATION

This application is based on and claims priority under 35 USC 119 from Japanese Patent Application No. 2023-186986, filed on Oct. 31, 2023, the disclosure of which is incorporated by reference herein.

BACKGROUND

Technical Field

The present disclosure relates to a control method, and a computer-readable storage medium stored with a control program.

Related Art

For example, Medical Tests, Volume 66 (2017), J-STAGE-No. 1, pages 18 to 50, published by the Japanese Association of Medical Technologists (Non-Patent Document 1) describes a clinical laboratory technician placing urine sample on a slide glass, and performing a visual microscopic examination of material components contained in the urine sample using a microscope.

In a urinary sediment examination by a clinical laboratory technician, time is needed to obtain test results due to this involving, for example, a clinical laboratory technician looking at a urine sample with a microscope to see whether or not there are bacteria present in the urine sample.

This means that progress is being made in the development of urine component analyzers using, for example, cytometry methods and image processing methods.

Urine component analyzers using image processing methods capture images of material components contained in urine samples, recognize the characteristic morphology and textures of each material component, and analyze the types of the material components contained in the urine sample. They also sometimes transmit captured images to information-processing equipment used by a clinical laboratory technician in order to confirm the analysis results.

This means that when videos are captured from the start for all urine samples then the transmission time of captured images is longer due to the volume of video data being greater than for still images.

SUMMARY

An object of the present disclosure is to provide a control method for a urine component analyzer and a control program that are capable of curtaining a volume of image data for processing compared to cases in which images are captured with video for all urine samples to be investigated for the presence or absence of bacteria.

In order to achieve the above object, a control method according to an aspect of the present disclosure is processing executed by a computer. The processing includes: capturing an image of a urine sample with video using an imaging device and storing the image of the urine sample captured as video in a storage device in cases in which movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images.

Furthermore, in order to achieve this object, a control program according to an aspect of the present disclosure is a program that causes processing to be executed by a computer. The processing includes: capturing an image of a urine sample with video using an imaging device and storing the image of the urine sample captured as video in a storage device in cases in which movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images.

The present disclosure exhibits the advantageous effect of enabling a volume of image data for processing to be curtailed compared to cases in which images are captured with video for all urine samples to be investigated for the presence or absence of bacteria.

BRIEF DESCRIPTION OF THE DRAWINGS

Exemplary embodiments of the present disclosure will be described in detail based on the following figures, wherein.

DETAILED DESCRIPTION

Figure 1:
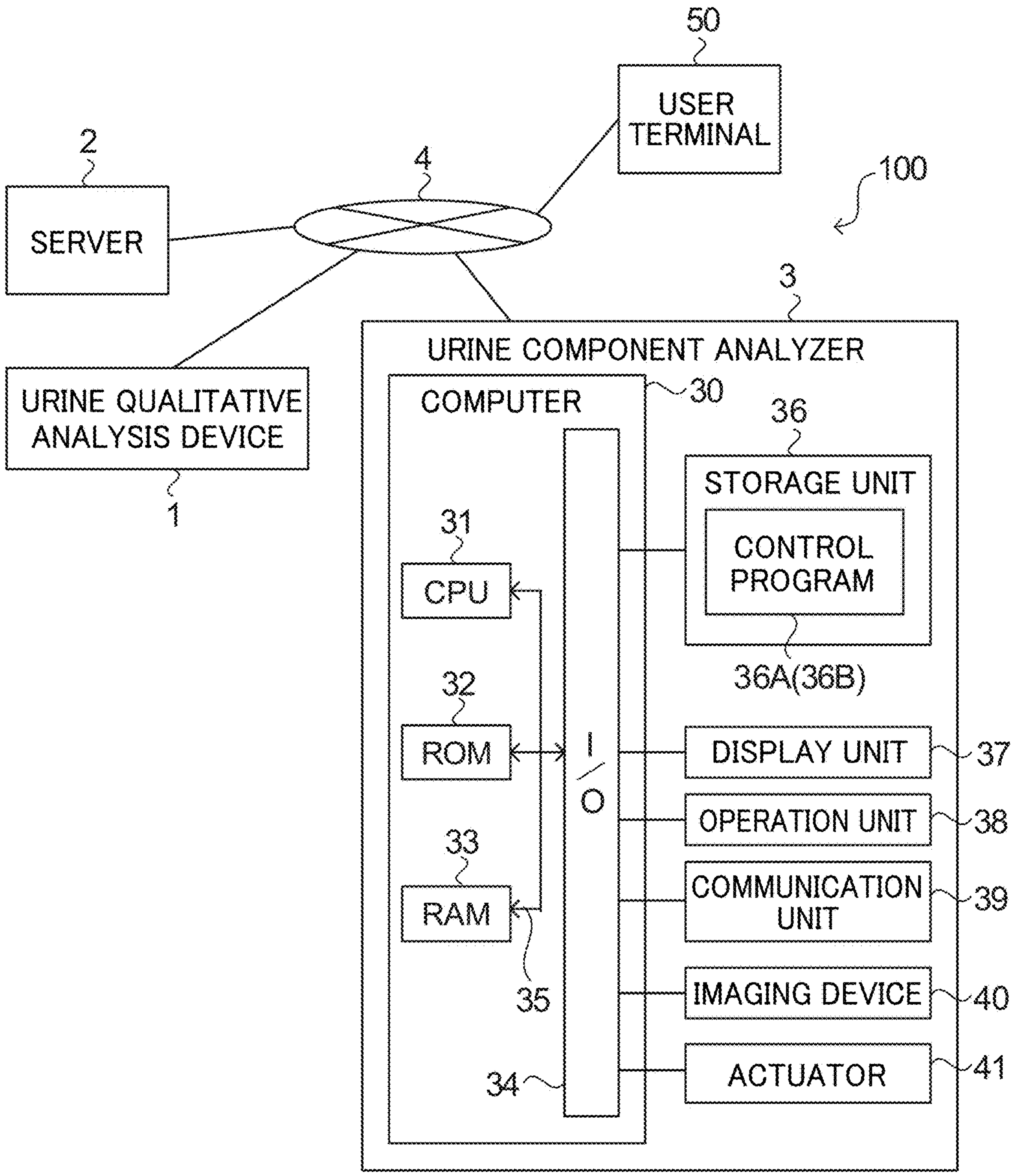
FIG. 1 is a diagram illustrating an example of a configuration of a medical information processing system.

Description follows regarding a present exemplary embodiment, with reference to the drawings. Note that the same reference numerals will be appended across the drawings to the same configuration elements and the same processing, and duplicate explanation thereof will be omitted. Moreover, dimensions and proportions in the drawings are exaggerated for ease of explanation, and sometimes differ from actual proportions.

FIG. 1 is a diagram illustrating an example of a configuration of a medical information processing system 100 in urinary sediment examination. Urinary sediment examination is an examination performed to identify types of material component contained in a urine sample of a patient from the morphology or the like of the material component, and to perform various analyses, such as counts and concentrations of the material components. In a urinary sediment examination, the types of material components are identified, such as, for example, red blood cells, white blood cells, non-squamous epithelial cells, squamous epithelial cells, bacteria, crystals, yeasts, hyaline casts, other casts (also called pathological casts), mucous threads, sperm, white blood cell clumps, and the like.

As illustrated in FIG. 1, a medical information processing system 100 includes a urine qualitative analysis device 1, a server 2, a urine component analyzer 3, and a user terminal 50, with each of the urine qualitative analysis device 1, the server 2, the urine component analyzer 3, and the user terminal 50 connected together with a communication line 4. There is no limitation to the connection mode of the communication line 4, and it may be a wired or wireless connection. Moreover, there is also no limitation to the type of the communication line 4, and the communication line 4 may, for example, use the internet, or a line such as a local area network (LAN) or a Wide Area Network (WAN).

When a urinary sediment examination is going to be performed, a urine qualitative test is performed in advance using the urine qualitative analysis device 1. The urine qualitative test is, for example, a test to determine whether or not there are components to be measured present in the urine sample by measuring changes in the color of a test paper called a test tape that changes color when urine is applied thereto due to a reaction with a component to be measured present in the urine sample, and that also measures a concentration or the like of the component to be measured in the urine sample. In the urine qualitative test the following are, for example, measured: the pH of the urine sample, the specific gravity of the urine sample, a cloudiness level of the urine sample, and also the presence or absence, and contained amounts, in the urine sample of proteins, sugars, ketone bodies, bilirubin, urobilinogen, occult blood reaction, nitrites, and white blood cells.

The urine qualitative analysis device 1 is equipped with a barcode reader (omitted in the drawings) for reading a sample ID of the urine sample to be measured from a barcode label affixed to a side face of a Spitz tube (omitted in the drawings) containing a urine sample. The urine qualitative test results of the urine sample measured by the urine qualitative analysis device 1 are associated with this sample ID of the urine sample, and the urine qualitative test results associated with the sample ID are transmitted to the server 2 through the communication line 4.

On receipt of the urine qualitative test results associated with the sample ID from the urine qualitative analysis device 1, the server 2 stores the urine qualitative test results associated with the sample ID in a storage device.

The urine qualitative analysis device 1 does not necessarily store the urine qualitative test results in the server 2, and may store them in a storage device of the urine qualitative analysis device 1. In such cases the server 2 is not needed in the medical information processing system 100.

Note that the urine sample test categories include, for example, categories that are difficult to analyze using a urine qualitative test alone, such as determination of the presence or absence the bacteria *Escherichia coli, Enterococcus, Staphylococcus*, and *Streptococcus*. A clinical laboratory technician accordingly takes the sample ID of the urine sample that has completed the urine qualitative test by the urine qualitative analysis device 1 and transmits the sample ID from the urine qualitative analysis device 1 to the urine component analyzer 3 through the communication line 4 to order a urinary sediment examination from the urine component analyzer 3.

On receipt of the sample ID from the urine qualitative analysis device 1, the urine component analyzer 3 appends the received sample ID to a urine qualitative test result acquisition request in order to acquire any urine qualitative test results associated with the sample ID, and transmits the urine qualitative test result acquisition request appended with the sample ID to the server 2 through the communication line 4.

The server 2 that has received the urine qualitative test result acquisition request acquires any urine qualitative test results associated with the sample ID that was appended to the urine qualitative test result acquisition request from a storage device, and transmits the acquired urine qualitative test results to the urine component analyzer 3 through the communication line 4.

The urine qualitative test result of the urine sample for which a urinary sediment examination order has been received is thereby passed to the urine component analyzer 3.

An image of the urine sample is captured by the urine component analyzer 3, and determination is made as to the presence or absence of various types of material component contained in the urine sample, however in the following a description will be given of determination of the presence or absence of bacteria as an example thereof. Note that reference in the present exemplary embodiment to "image" includes still images and videos.

The urine component analyzer 3 transmits a determination result of the presence or absence of bacteria, together with the captured image of the urine sample, to the user terminal 50.

The user terminal 50 is a terminal used by a clinical laboratory technician specialized in the classification of material components contained in urine samples (hereafter referred to as a "specialist clinical laboratory technician"). The specialist clinical laboratory technician references the image of the urine sample received from the urine component analyzer 3, and makes a final determination as to the presence or absence of bacteria contained in the urine sample. The user terminal 50 is an example of an external device.

As illustrated in FIG. 1, the urine component analyzer 3 is configured by, for example, a computer 30. The computer 30 includes a central processing unit (CPU) 31 serving as an example of a processor, read only memory (ROM) 32, random access memory (RAM) 33, and an input-output interface (I/F) 34, with the CPU 31, the ROM 32, the RAM 33, and the I/O 34 connected together through a bus 35.

The ROM 32 is, for example, stored with a start-up program (basic input output system (BIOS)) for the CPU 31 to perform start-up processing of the computer 30. The RAM 33 is employed as a temporary work area of the CPU 31.

The computer 30 configuring the urine component analyzer 3 may be a personal computer (PC), and may also, for example, be a portable device such as a smartphone or a tablet terminal.

A later-described control section 26 (see FIG. 6) is configured from the CPU 31, the ROM 32, the RAM 33, and the I/O 34.

A storage unit 36, a display unit 37, an operation unit 38, a communication unit 39, an imaging unit 40, and an actuator 41 are, for example, connected to the I/O 34. These units are all connected to the CPU 31 through the I/O 34.

The storage unit 36 is an example of a storage device in which stored information is preserved even if power supply to the storage unit 36 is interrupted and, for example, may be a hard disk employing a semiconductor memory such as a solid state drive (SSD). The storage unit 36 may also be a portable semiconductor memory that is attachable/detachable to/from the computer 30, such as a universal serial bus (USB) memory or a memory card.

The storage unit 36 is pre-stored with control programs 36A, 36B read by the CPU 31 to determine the presence or absence of bacteria in the urine sample. Moreover, the storage unit 36 is also, as well as the control programs 36A, 36B, pre-stored with various parameters to reference when the CPU 31 is controlling the urine component analyzer 3. Note that the control programs 36A, 36B and the various parameters are not necessarily stored on the storage unit 36, and may be stored on the ROM 32.

The display unit 37 serving as an example of a display device may, for example, employ a liquid crystal display (LCD), an organic electro luminescence (EL) device, or the like. The display unit 37 may include an integral touch panel. The display unit 37 displays results of processing executed according to instructions received from a clinical laboratory technician, or the like, notifications regarding processing, and the like.

The operation unit 38 is, for example, provided with a device for operational input, such as buttons, a touch panel, a keyboard, a mouse, a pointing device, or the like. Through operation of the operation unit 38 a clinical laboratory technician notifies instructions to the CPU 31 of the urine component analyzer 3.

The communication unit 39 is connected to the communication line 4, and is equipped with a communication protocol to perform mutual data communication between the urine qualitative analysis device 1, the server 2, and the user terminal 50.

The imaging unit 40 is provided with an imaging lens and an imaging device disposed on the optical axis of the imaging lens, and captures images of material components contained in urine samples. The imaging device is, for example, a charge coupled device (CCD).

The actuator 41 moves an imaging location on the urine sample by the imaging unit 40. Note that a detailed description will be given later regarding operation of the imaging unit 40 and the actuator 41.

Figure 2:
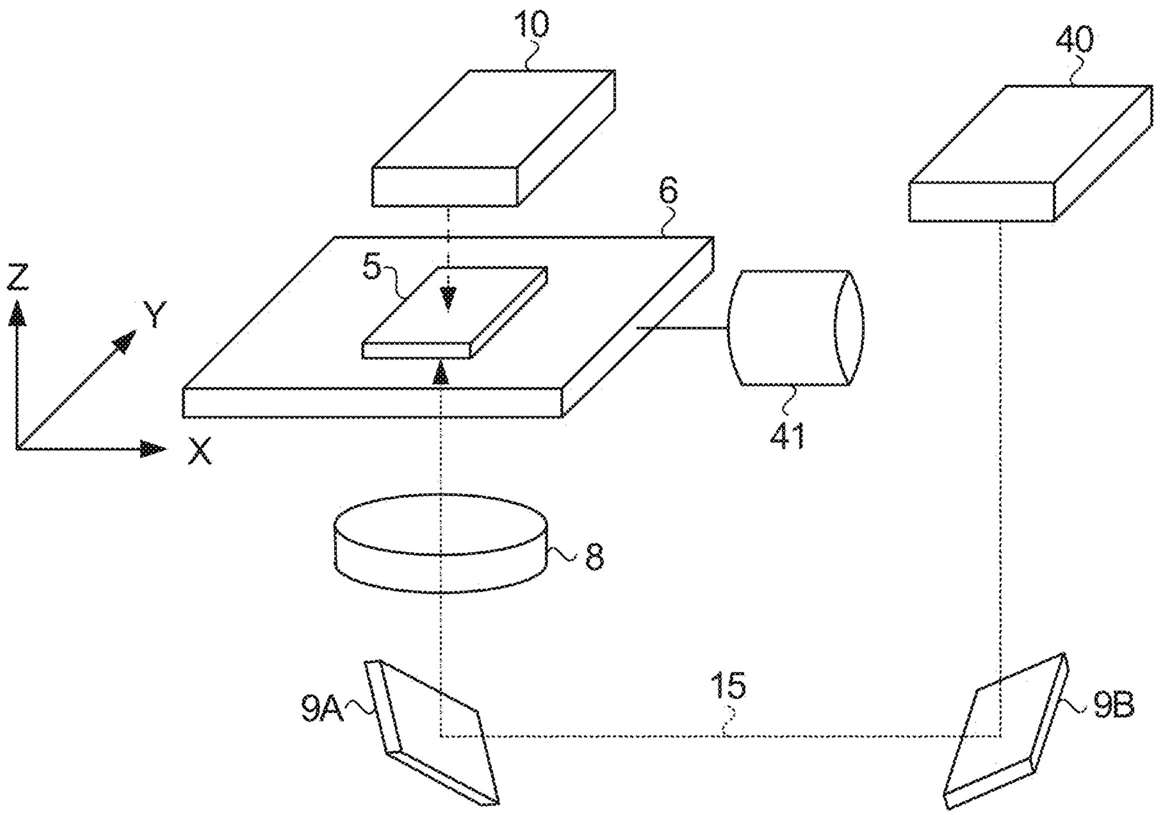
FIG. 2 is a diagram illustrating an example of a device configuration of a urine component analyzer.

Next, description follows regarding a method of analyzing urine samples by the urine component analyzer 3. FIG. 2 is a diagram illustrating an example of a device configuration of the urine component analyzer 3. In FIG. 2 a Z axis indicates a vertical direction (namely gravity direction), an X axis indicates a direction orthogonal to the Z axis, and a Y axis indicates a direction orthogonal to both the X axis and the Z axis. Namely, two-dimensional coordinates defined by the X axis and the Y axis express positions in a flat plane orthogonal to the Z axis (called an "XY plane"), and three-dimensional coordinates defined by the X axis, the Y axis, and the Z axis express positions in the space where the urine component analyzer 3 is situated.

The urine component analyzer 3 includes a plate 6, an imaging device 40, a lens 8, a mirror 9A, a mirror 9B, a light source 10, and an actuator 41. A cell 5 encapsulating a urine sample corresponding to the sample ID received from the urine qualitative analysis device 1 is disposed on the plate 6.

Figure 3:
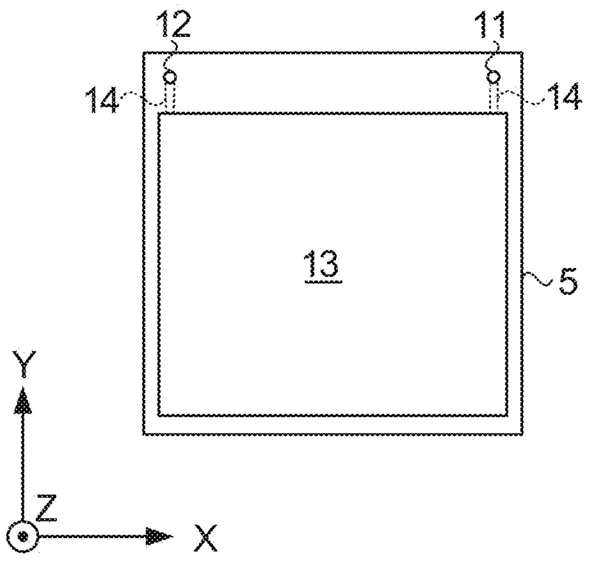
FIG. 3 is a diagram illustrating an example of a cell.

The cell 5 is configured such that the imaging unit 40 is able to capture an image of material components contained in the encapsulated urine sample by being configured from a transparent container formed, for example, from a synthetic resin such as acrylic, polycarbonate, polyethylene terephthalate or the like. As illustrated in FIG. 3, there is a cavity 13 capable of encapsulating the urine sample present inside the cell 5, and the urine sample reaches the cavity 13 through a flow path 14 when a clinical laboratory technician uses a pipette or the like to inflow the urine sample through an inflow port 11 provided in the cell 5. In addition to the inflow port 11, a discharge port 12 is also present in the cell 5 and, for example, any overflowing urine sample from the cavity 13 is discharged from the discharge port 12 through a flow path 14. Note that reference to the cell 5 being "transparent" means that it has a degree of transparency that enables the shape of an object to be confirmed when looking through the cell 5 at material present at the back of the cell 5 and the object in the cavity 13 of the cell 5.

The cell 5 is disposed on the plate 6 such that a lower face of the cell 5, which is a contact face with the plate 6, is parallel to the XY plane. In the present exemplary embodiment, parallel means in addition to a state in which the lower face of the cell 5 and the XY plane will not cross however far the two planes are extended, namely, a completely parallel state, also includes cases in which there is a degree of inclination therebetween such that they may be treated as two parallel planes.

Although there are no particular limitations to the shape of the cell 5 when the cell 5 is viewed toward the XY plane, a rectangular shaped cell 5 is employed as an example in the present exemplary embodiment. In such cases the X axis is set along one side of the cell 5, and the Y axis is set along a side orthogonal to the side of the cell 5 along the X axis.

Note that a length of the cell 5 along the Z axis direction (hereafter referred to as the "thickness of the cell 5") is the same at whatever location, and the thickness of the cell 5 is shorter than the length of the cell 5 along both the X axis direction and the Y axis direction. Namely, the cell 5 has a cuboidal shape.

The light source 10 is, for example, provided at a position that is further upward along the Z axis direction than the position of the cell 5 and that is a position facing the cell 5, and radiates light toward the cell 5 such that the imaging unit 40 is easily able to capture an image of the material components contained in the urine sample.

The imaging unit 40 images the material components contained in the urine sample encapsulated in the cell 5. The imaging unit 40 is, for example, disposed on a top face of a case (omitted in the drawings) of the urine component analyzer 3 in a state such that the imaging lens in the imaging unit 40 faces downward along the Z axis direction. In this case, due to an optical axis 15 of the imaging device 40, namely the optical axis of the imaging lens, facing downward along the Z axis direction, a mirror face of the mirror 9B that is present on an extension line of the optical axis is imaged (see FIG. 2). However, by adjusting an angle of the mirror 9A such that the cell 5 is reflected in the mirror face of the mirror 9B, the material components contained in the urine sample encapsulated in the cell 5 can be imaged by the imaging device 40.

Namely, the imaging device 40 images the cell 5 from bottom to top along the Z axis direction from a position facing the bottom face of the cell 5. In other words, the imaging device 40 images a urine sample along the thickness direction of the cell 5. The direction of imaging the cell 5 from bottom to top along the Z axis direction from a position facing the bottom face of the cell 5 is called the "imaging direction by the imaging device 40".

The material components contained in the urine sample encapsulated in the cell 5 precipitate toward the bottom face of the cell 5 with the passage of time under the action of gravity. This means that the imaging device 40 is more easily able to image the material components contained in the urine sample than cases in which the cell 5 is imaged from the face of the cell 5 when looking at the cell 5 disposed on the plate 6 from top to bottom along the Z axis direction, namely when imaged from the top face of the cell 5.

Note that the thickness of the cell 5 is preferably 1000 μm due to there being a tendency for the material components contained in the urine sample to be imaged in an overlapped state as the thickness of the cell 5 gets thicker, and also in order to widen the adjustable range of the focal point of the imaging device 40.

The lens 8 is disposed partway between the cell 5 and the mirror 9A, such that the lens 8 and the optical axis 15 of the imaging device 40 meet up, namely such that the optical axis of the lens 8 and the optical axis 15 of the imaging device 40 are aligned, enlarging the magnification of the material components contained in the urine sample to a magnification instructed by the clinical laboratory technician. This means that the imaging device 40 is able to image material components contained in the urine sample at the magnification as instructed by the clinical laboratory technician. This naturally means that in cases in which the imaging device 40 is equipped with an image enlargement/contraction function (a so-called zoom function), the material components contained in the urine sample may be imaged at the magnification instructed by the clinical laboratory technician using the enlargement/contraction function of the imaging device 40.

Figure 4:
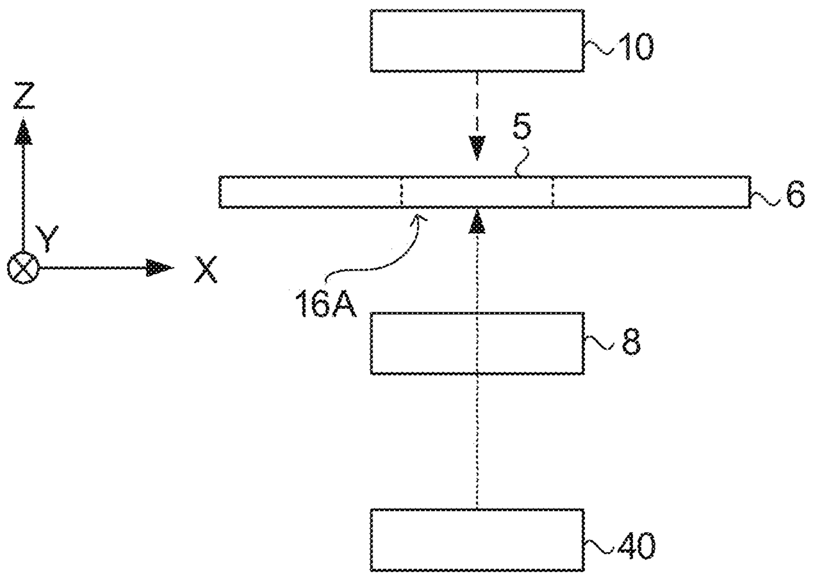
FIG. 4 is a diagram illustrating an example of a disposition of a cell on a plate.
Figure 5:
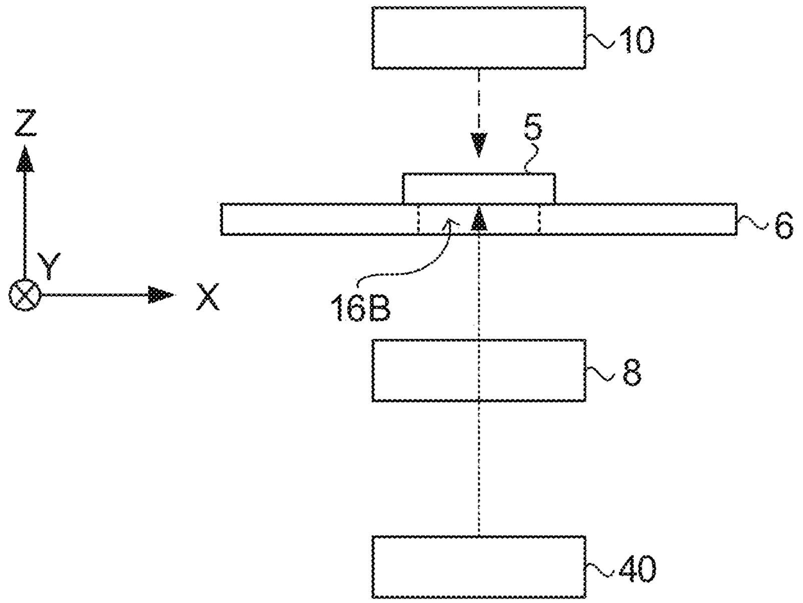
FIG. 5 is a diagram illustrating an example of another disposition of a cell on a plate.

Note that in cases in which the cell 5 is disposed on the plate 6, a portion of the plate 6 for loading the bottom face of the cell 5 onto may be configured using a transparent material the same as the cell 5 so as not to impede imaging of the cell 5 by the imaging device 40. Moreover, the cell 5 may be embedded in a hole 16A formed in the plate 6 so as to match the shape of the cell 5 as illustrated in FIG. 4, and the cell 5 may be disposed above a hole 16B piercing through the plate as illustrated in FIG. 5. There is no particular limitation to the shape of the hole 16B in such cases.

Moreover, the example of the device configuration of the urine component analyzer 3 illustrated in FIG. 2 illustrates an example in which the imaging device 40 is disposed in a state such that the imaging lens faces downward along the Z axis direction. However, the imaging device 40 may be disposed below the cell 5 in a state such that the imaging lens faces upward along the Z axis direction, as illustrated in FIG. 4 and FIG. 5. Such cases do not require the mirrors 9A, 9B to bend the optical axis 15.

Namely, there is no limitation to the position of the imaging device 40 in the urine component analyzer 3, and whichever position the imaging device 40 is attached the urine component analyzer 3 is able, for example by adjusting the position and number of the mirrors 9A, 9B, to image the material components contained in the urine sample from the bottom face of the cell 5.

The actuator 41 is a drive source to move the plate 6 independently in the X axis direction and the Y axis direction. Specifically, the actuator 41 is equipped with a pulse motor that performs a rotational movement of an amount according to a number of pulses applied thereto, and a conversion mechanism, such for example as a rack and pinion mechanism, a ball screw, or the like, to convert the rotational movement of the pulse motor into movement of the plate 6 along the X axis direction and the Y axis direction. The actuator 41 moves the plate 6 by a distance according to the number of pulses applied to the pulse motor. This means that the imaging location of the cell 5 can be moved along the XY plane by driving the actuator 41, while the position of the imaging device 40 and the positions of the mirrors 9A, 9B remain fixed.

Note that the imaging device 40 may be any kind of device for which capture of still images or videos can be selected and, for example, may be a digital camera, an in-build camera of a smartphone, an in-build camera of a wearable device, an in-build camera of the computer 30, or the like. The urine component analyzer 3 according to the present exemplary embodiment performs imaging of material components contained in the urine sample using the in-build camera of a smartphone.

Figure 6:
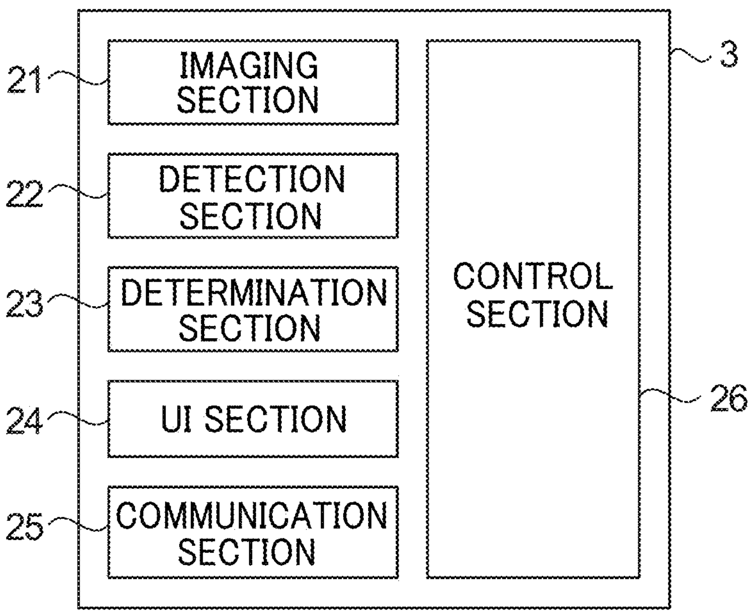
FIG. 6 is a diagram illustrating an example of a functional configuration of a urine component analyzer.

Next, description follows regarding the functions of the urine component analyzer 3. FIG. 6 is a diagram illustrating an example of a functional configuration of the urine component analyzer 3. As illustrated in FIG. 6, the urine component analyzer 3 includes an imaging section 21, a detection section 22, a determination section 23, a user interface (UI) section 24, a communication section 25, and a control section 26.

The imaging section 21 uses the imaging device 40 to capture an image of the material components contained in the urine sample encapsulated in the cell 5.

The detection section 22 detects movement of the material components contained in the urine sample from images captured by the imaging section 21.

The determination section 23 determines whether or not the material components contained in the captured images are bacteria.

The UI section 24 receives instructions of a clinical laboratory technician through the operation unit 38, and notifies these to the control section 26, described later. The UI section 24 displays, on the display unit 37, images of material components contained in the urine sample imaged by the imaging section 21, determination results as to the presence or absence of bacteria in the urine sample, various information processed by the control section 26 according to the instructions received from the clinical laboratory technician, notifications regarding processing, and the like.

The communication section 25 performs mutual data communication between the urine qualitative analysis device 1, the server 2, and the user terminal 50 through the communication unit 39.

The control section 26 controls each processing of the imaging section 21, the detection section 22, the determination section 23, the UI section 24, and the communication section 25, and executes operation of the urine component analyzer 3 as instructed by the clinical laboratory technician.

Figure 7:
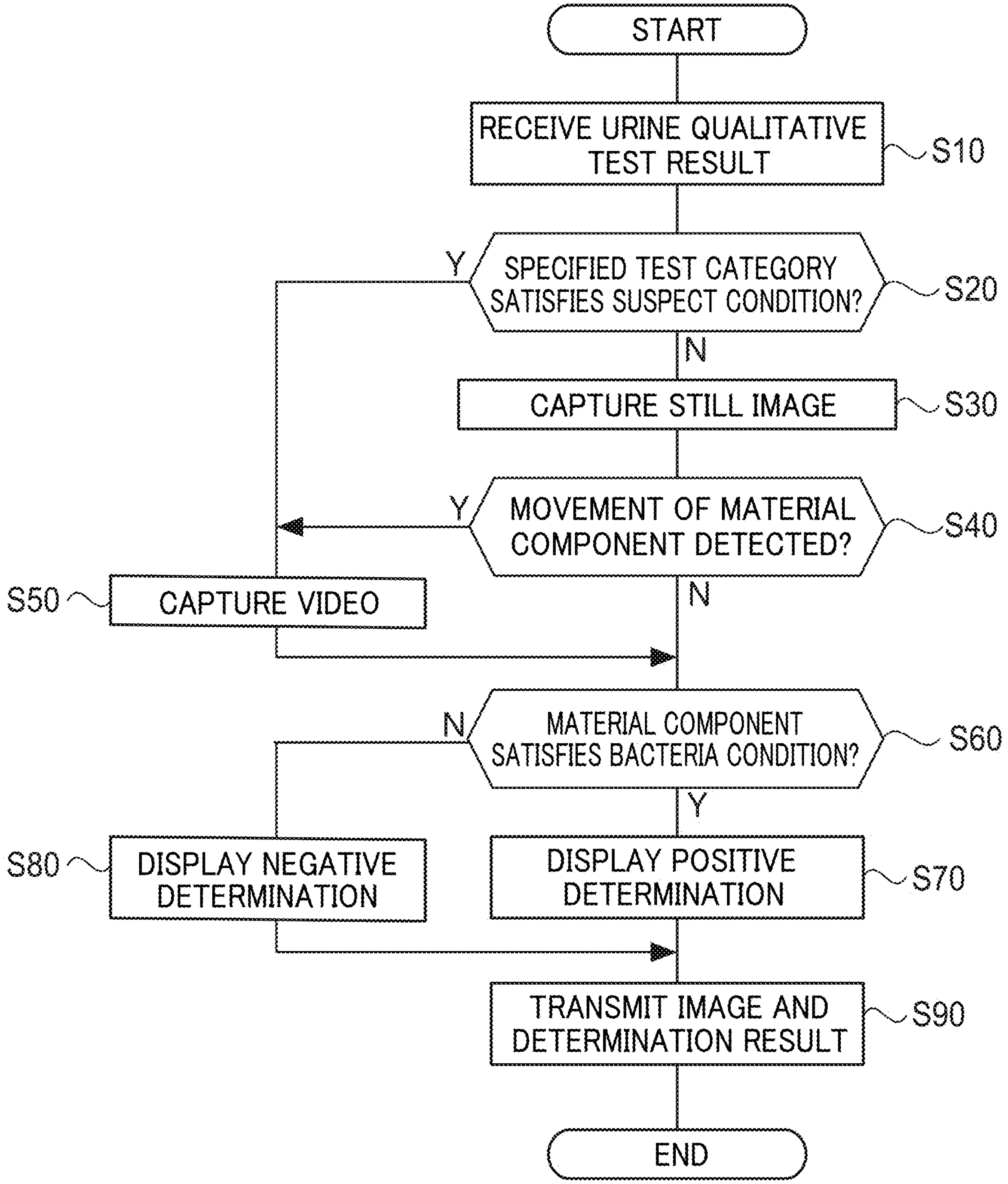
FIG. 7 is a flowchart illustrating an example of a flow of determination processing to determine the presence or absence of bacteria.

Next, detailed description follows regarding operation of the urine component analyzer 3. FIG. 7 is a flowchart illustrating an example of a flow of determination processing of the presence or absence of bacteria executed by the CPU 31 of the urine component analyzer 3 in cases in which a sample ID of a urine sample is has been received from the urine qualitative analysis device 1. The CPU 31 of the urine component analyzer 3 reads a control program 36A stored in the storage unit 36, and executes determination processing.

Note that urine qualitative test results associated with the sample ID received by the urine component analyzer 3 are assumed to be pre-stored in the server 2.

First, at step S10, the control section 26 controls the communication section 25, and transmits a urine qualitative test result acquisition request appended with the received sample ID to the server 2. The urine component analyzer 3 thereby receives urine qualitative test results associated with the sample ID from the server 2 through the communication line 4.

At step S20, the control section 26 determines whether or not a result of a predetermined test category (hereafter referred to as a "specified test category") from out of the received urine qualitative test results has satisfied a suspect condition defining a condition of cases in which the presence of bacteria in urine is suspected.

The specified test category includes, for example, a white blood cell content, a nitrite content, and a cloudiness level of the urine sample, which have a correlation to the presence or absence of bacteria. The cloudiness level of the urine sample is expressed by a value and, for example, a higher value expressing the cloudiness level means the urine sample is more cloudy.

It is known that there is a high possibility that bacteria are contained in urine when any one specified test category from out of the white blood cell content, the nitrite content, or the cloudiness level of the urine sample is higher than a predetermined reference value associated with each of the respective specified test categories. This means that the storage unit 36 is pre-stored as a suspect condition set as a condition in which the value of any one specified test category out of the white blood cell content, the nitrite content, or the cloudiness level of the urine sample is higher than the reference value of the respective specified test category.

The specified test categories in the suspect condition, the reference values, and the magnitude relationship between the specified test categories and the reference values, are each able to be changed by the clinical laboratory technician. This means that reference values for the white blood cell content, the nitrite content, and the cloudiness level of the urine sample can be set to content generally determined for clinical laboratory tests, and may be set to content other therefrom. Moreover, for example, a content of a material component other than white blood cells or nitrates may be set in the specified test categories. Moreover, the suspect condition at which there is a suspicion of bacteria being present in the urine may be set to cases in which the white blood cell content, the nitrite content, and the cloudiness level of the urine sample are all higher than their respective reference values, namely to cases in which the white blood cell category, the nitrite content category, and the cloudiness level category of the urine qualitative test are all positive. Furthermore, the suspect condition at which there is a suspicion of bacteria being present in the urine may be set to "cases in which the previous value was positive for bacteria" and "instructed by a doctor".

There is a high probability that bacteria are present in the urine sample represented by the sample ID in cases in which the specified test categories have satisfied the suspect condition, and so processing transitions to step S50.

At step S50, the control section 26 controls the imaging device 40, a video is captured of the urine sample encapsulated in the cell 5, and the captured video of the urine sample is stored, for example, in the storage unit 36 before then transitioning to step S60. Movement of material components contained in the urine sample is recorded by capturing video as the image of the urine sample.

A frame rate expressing the number of frames per second of fame images configuring the video and a video capture time are, for example, set by the clinical laboratory technician, or pre-stored in the storage unit 36. The imaging section 21 uses the imaging device 40 to perform video capture according to the set frame rate and capture time. The frame rate and video capture time are able to be changed by the clinical laboratory technician.

Note that during video capture, the imaging location on the cell 5 by the imaging device 40 is fixed such that the positions of the cell 5, the plate 6, the imaging device 40, the mirror 9A, and the mirror 9B are not changed.

Processing transitions to step S30 in cases in which the determination processing of step S20 has determined that the specified test category has not satisfied the suspect condition.

Cases in which the specified test category has not satisfied the suspect condition have a higher probability that bacteria are not present in the urine sample represented by the sample ID than cases in which the specified test category has satisfied the suspect condition. The control section 26 accordingly controls the imaging device 40 at step S30, and captures plural still images of the urine sample encapsulated in the cell 5 as a time series. The control section 26 stores each of the captured still images of the urine sample in the storage unit 36, for example.

As described above, cases in which the specified test category has not satisfied the suspect condition have a lower probability of bacteria being present in the urine sample than cases in which the specified test category has satisfied the suspect condition, and so it is more difficult to recognize bacteria in images of the urine sample. Images of these urine sample are accordingly captured as still images that have higher resolution than videos, thereby facilitating recognition of the morphology and position of material components contained in the urine sample.

Note that the captured still images may be either gray scale images or color images. A capture-time separation between the still images is in accordance with a capture-time separation (for example 0.03 seconds) stored in the storage unit 36, for example. Moreover, the number of captured still images is also in accordance with an image capture number (for example two) stored in the storage unit 36. The capture-time separation and the image capture number of the still images are able to be amended by the clinical laboratory technician.

Note that the imaging location of the cell 5 by the imaging device 40 is fixed during capturing still images such that the positions of the cell 5, the plate 6, the imaging device 40, the mirror 9A, and the mirror 9B are not changed.

Figure 8:
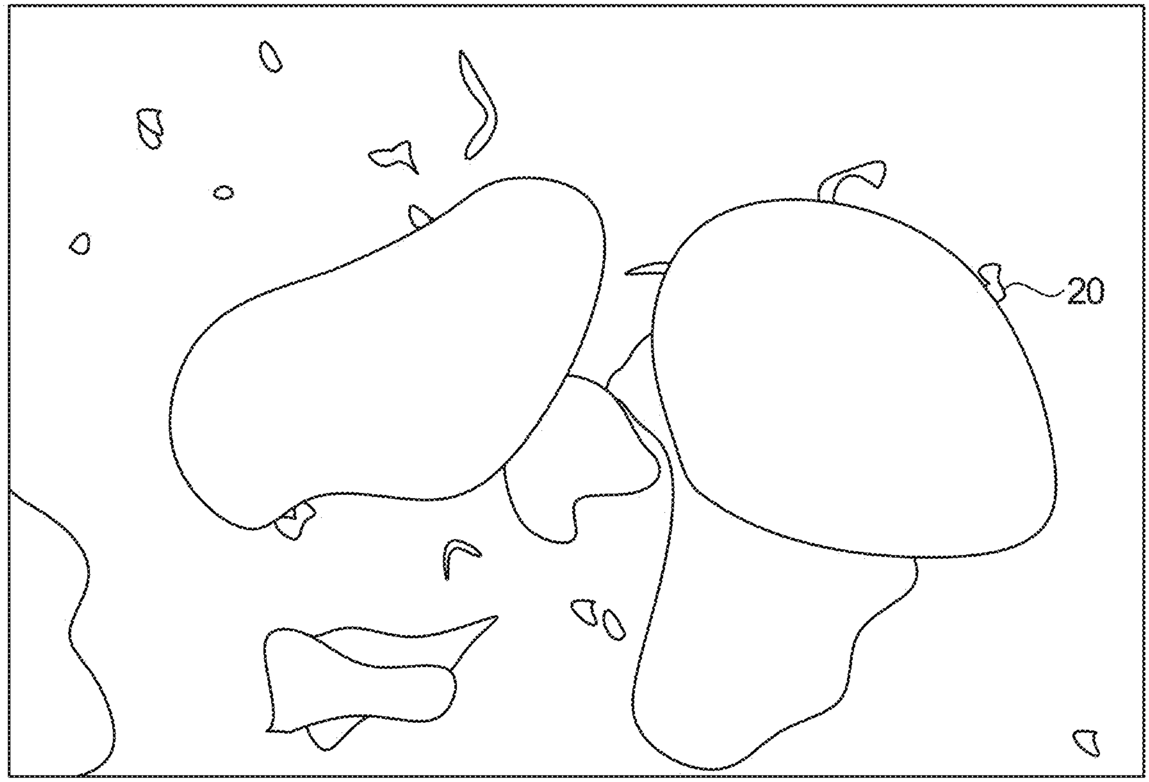
FIG. 8 is a diagram illustrating an example of a still image.

FIG. 8 is a diagram illustrating an example of a still image captured of the material components contained in the urine sample encapsulated in the cell 5. In FIG. 8 the material component 20 represents a bacterium.

At step S40, the control section 26 controls the detection section 22, and detects any movement of a material component contained in the urine sample from plural still images captured in a time series. Specifically, the detection section 22 recognizes the morphology of the material components contained in two still images using a known outline extraction method or the like. In addition, the detection section 22 uses a degree of similarity in morphology of material components, a degree of similarity in size of material components, and positions of material components in the still images, to associate any material components contained in two still images that are the same material component with each other, and acquires a difference between positions of the material component contained in the respective still images for each of the material components.

Figure 9:
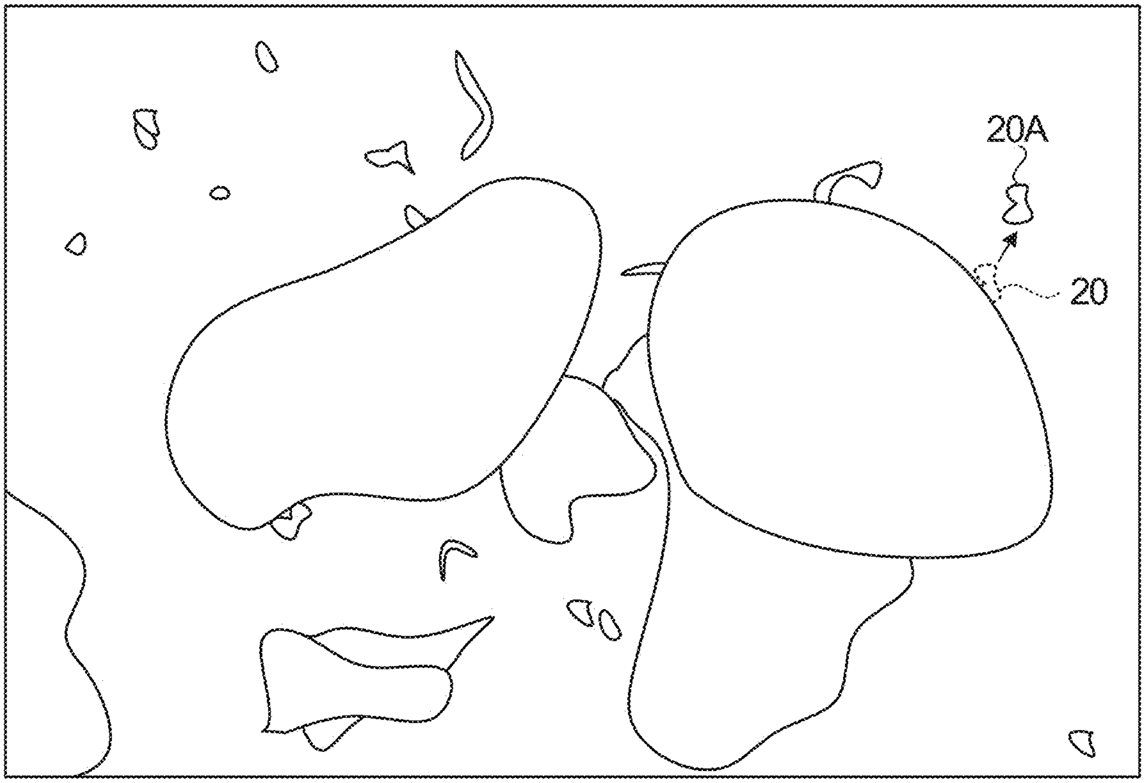
FIG. 9 is a diagram illustrating an example of a difference in positions of a material component.

FIG. 9 is a diagram illustrating an example of a difference in position of a material component contained in a separate still image to the still image illustrated in FIG. 8, as captured at a different time to the still image illustrated in FIG. 8. The material component 20 in FIG. 9 indicates the position of the material component 20 as illustrated in FIG. 8, and the material component 20A indicates the position of the material component after movement of the material component 20 as extracted from a separate still image to the still image illustrated in FIG. 8. A difference is accordingly obtained between the positions of the material component 20 and the material component 20A.

A movement in a material component is confirmed when the difference between the positions of the material component 20 and the material component 20A is a predetermined threshold or greater, with this meaning that there is a possibility that this material component is a bacterium. This means that processing transitions to step S50 in order to successively image this material component and to record the movement of the material component, and a video of the urine sample is captured. The threshold for the difference in positions of the material components employed to determine whether or not to capture a video of the urine sample is, for example, set by the clinical laboratory technician or pre-stored in the storage unit 36. Moreover, the threshold for the difference in position of the material component is amendable. The control section 26 stores the captured video of the urine sample in the storage unit 36, for example.

Note that a movement speed of each of the material components is computable by obtaining the capture-time separation of two still images and the difference in positions of the material component in two still images. This means that instead of the difference in position of the material component, the detection section 22 may recognize movement of the material components as being detected in cases in which the movement speed of the material component is a predetermined threshold or greater. In such cases material components other than bacteria that do not move themselves, such as red blood cells, also sometimes move in the urine sample, for example under gravity. However, material components that are microbes such as bacteria sometimes move at speeds faster than material components that do not move themselves. This means that a threshold for comparing movement speeds of material components is, for example, preferably set to a standard movement speed of bacteria or greater.

Moreover, a threshold for comparing positions of material components is, for example, preferably set to a distance in consideration of the standard movement speed of bacteria.

Processing transitions to step S60 in cases in which the difference in positions between the material component 20 and the material component 20A is less than the predetermined threshold in the determination processing of step S40, and after the processing of step S50 has been completed.

In cases in which a video of the urine sample is imaged by the processing of step S50, movement of a material components can be confirmed as a continuous movement. Namely, the determination section 23 may, for example, determine from the video whether or not a movement characteristic of bacteria is seen that would be unable to be obtained from the movement speed of material components or the difference in positions thereof, such as for example by a deformation process in the shape of a material component accompanying movement, a rotation behavior of a material component in such a situation, a movement path, or a minute movement not exceeding a limit for detecting differences in position (also called "vibration").

This means that at step S60, the determination section 23 determines that bacteria are contained in the urine sample in cases in which a movement of a material component as obtained from the video satisfies at least one defined bacteria condition of characteristic movement of bacteria present in a urine sample, these being a deformation process in shape characteristic of bacteria, a manner of rotation characteristic of bacteria, a movement path characteristic of bacteria, or a vibration characteristic of bacteria. Processing then transitions to step S70.

Note that information representing a manner of movement characteristic of bacteria is set for a movement path in the bacteria conditions. For example, information indicating a zig-zag shaped path is set as a movement path in the bacteria conditions for cases in which bacteria move while alternately switching direction toward left and right.

Moreover, for the deformation process in bacteria conditions, for example, information expressing changes in shape characteristic of bacteria accompanying a movement may be set for cases in which bacteria move in urine using an elliptically shaped swollen reaction after contracting their shape in a linear shape.

A range of sizes possible for bacteria is limited. In other words, bacteria and other types of material component such as red blood cells can be differentiated using differences in size. A condition of a size of a material component falling inside a predetermined range possible for bacteria may be added as a bacteria condition.

The content of the bacteria conditions may be able to be changed by the clinical laboratory technician and, for example, may be pre-stored in the storage unit 36.

At step S70, the control section 26 controls the UI section 24, and displays a positive determination on the display unit 37 to indicate that bacteria are contained in the urine sample represented by the sample ID.

However, at step S60 the determination section 23 determines that bacteria are not contained in the urine sample in cases in which a video of the urine sample is not captured by the processing of step S50, namely, in cases in which movement of a material component is unable to be detected in the determination processing of step S40, and also in cases in which a movement of a material component obtained from a video has not satisfied the bacteria condition, and transitions to step S80.

At step S80, the control section 26 controls the UI section 24, and displays a negative determination on the display unit 37 indicating that bacteria are not contained in the urine sample represented by the sample ID.

After a determination result as to the presence or absence of bacteria contained in the urine sample has been displayed at step S70 or step S80, at step S90 the control section 26 controls the communication section 25, transmits the determination result as to the presence or absence of bacteria in the urine sample and the captured image, together with the sample ID, to the user terminal 50, and ends the determination processing illustrated in FIG. 7. In cases in which both a video and still images have been captured for the urine sample, the control section 26 transmits both the video and the still images to the user terminal 50.

A re-determination as to the presence or absence of bacteria contained in the urine sample is accordingly able to be performed in the user terminal 50 by the specialist clinical laboratory technician.

Note that the control section 26 may be configured so as to control the communication section 25, transmit the determination result as to the presence or absence of bacteria in the urine sample and the image, to the server 2, together with the sample ID, and associate the determination result and image with any urine qualitative test results in the server 2 associated with the same sample ID as the transmitted sample ID.

Moreover, from images of the urine sample stored in the storage unit 36, the control section 26 may display on the display unit 37 images of urine samples associated with a specified sample ID according to an instruction of a clinical laboratory technician performed through the operation unit 38. This means that a clinical laboratory technician is able to retrospectively confirm whether or not the determination result as to the presence or absence of bacteria is correct.

In this manner, the urine component analyzer 3 does not capture videos of the urine sample for all urine samples represented by the received sample IDs, and captures videos of the material components contained in the urine sample only in cases in which the specified test category of the urine sample represented by the received sample ID satisfies the suspect condition, and cases in which movement of a material component has been detected in still images captured of the urine sample. Namely, still images of the urine sample are captured instead of video for cases in which the specified test category of the urine sample represented by the received sample ID does not satisfy the suspect condition and also movement of a material component is not detected in the still images captured of the urine sample.

This means that a volume of data of images of the urine sample for processing by the urine component analyzer 3 is curtailed compared to cases in which videos are captured for all the urine samples represented by the sample ID received from the urine qualitative analysis device 1. This thereby enables transmission time for the urine component analyzer 3 to transmit images to the user terminal 50 to be shortened compared to cases in which videos are captured and transmitted to the user terminal 50 for all the urine samples.

Moreover, the amount of compute of images in the determination processing and the amount of image storage can be curtailed due to curtaining the volume of image data of the urine samples, and so this enables a reduction to be made in demands by the urine component analyzer 3 for resource performance and storage capacity of the CPU 31, the RAM 33, and the like. This accordingly contributes to a reduction in cost of the urine component analyzer 3.

Cell Shape: Modified Example

In the urine component analyzer 3 described above, for example as illustrated in FIG. 2, a urine sample is encapsulated in a cuboidal cell 5, and images of the urine sample are captured. However, the shape of the cell 5 is not necessarily cuboidal. Description follows regarding using a cell 5A having a shape different to the cuboidal cell 5 in determination processing to determine the presence or absence of bacteria.

Figure 10:
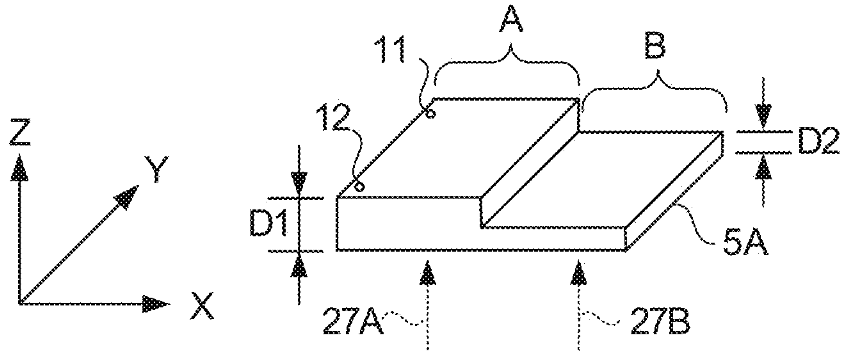
FIG. 10 is a diagram illustrating an example of a step-shaped cell.

FIG. 10 is a diagram illustrating an example of a shape of the cell 5A for encapsulating a urine sample. As illustrated in FIG. 10, the cell 5A has a stepped shape with the thickness of the cell 5A along the imaging direction being respectively different in an area A and an area B. A thickness D2 of the cell 5A in the area B serving as an example of a second thickness is thinner than a thickness D1 of the cell 5A in the area A serving as an example of a first thickness. This means that, from the perspective of ease of processing, an inflow port 11 and a discharge port 12 are respectively provided in the area A of the cell 5A.

In cases in which a urine sample has been encapsulated in the cell 5A, the thickness D2 of the cell 5A at the area B is thinner than the thickness D1 of the cell 5A in the area A. This means that if the surface areas in the XY plane are the same for the area A and the area B, then the number of material components contained in the area B is fewer than the number of material components contained in the area A. If the number of material components contained in the area B is fewer than the number of material components contained in the area A, then the probability of seeing material components overlapped with each other when the area B is looked at in the imaging direction is lower than the probability of seeing material components overlapped with each other when the area A is looked at in the imaging direction. Namely, all the shape of each of the material components is more easily captured for captured material components contained in the area B than when capturing material components contained in the area A.

Capturing all the shape of the material components without the material components being overlapped with each other makes it easier to determine the presence or absence of bacteria contained in the urine sample than cases in which a situation arises in which bacteria are obscured behind large material components, such that only part of the shape of the bacteria can be confirmed.

Note that as long as the thickness D2 of the cell 5A in the area B is not greater than ⅕ the thickness D1 of the cell 5A in the area A then the number of material components contained in the area B will be significantly less than the number of material components contained in the area A. Moreover, the thickness D2 of the cell 5A in the area B is preferably not greater than ⅒ of the thickness D1 of the cell 5A in the area A. If the thickness D1 of the cell 5A in the area A is, for example, 1000 μm, then the thickness D2 of the cell 5A in the area B is not greater than 200 μm, and is preferably not greater than 100 μm.

A lower limit of the thickness D2 of the cell 5A in the area B is 100 μm or greater. In cases in which the thickness D2 of the cell 5A in the area B is less than 100 μm, not only is it more difficult for the urine sample to enter the area B from the area A of the cell 5A due to the effect of surface tension, but the manufacture of the cell 5A is itself also difficult.

Hereafter reference simply to "area A" means area A of the cell 5A, and reference simply to "area B" means area B of the cell 5A.

Figure 11:
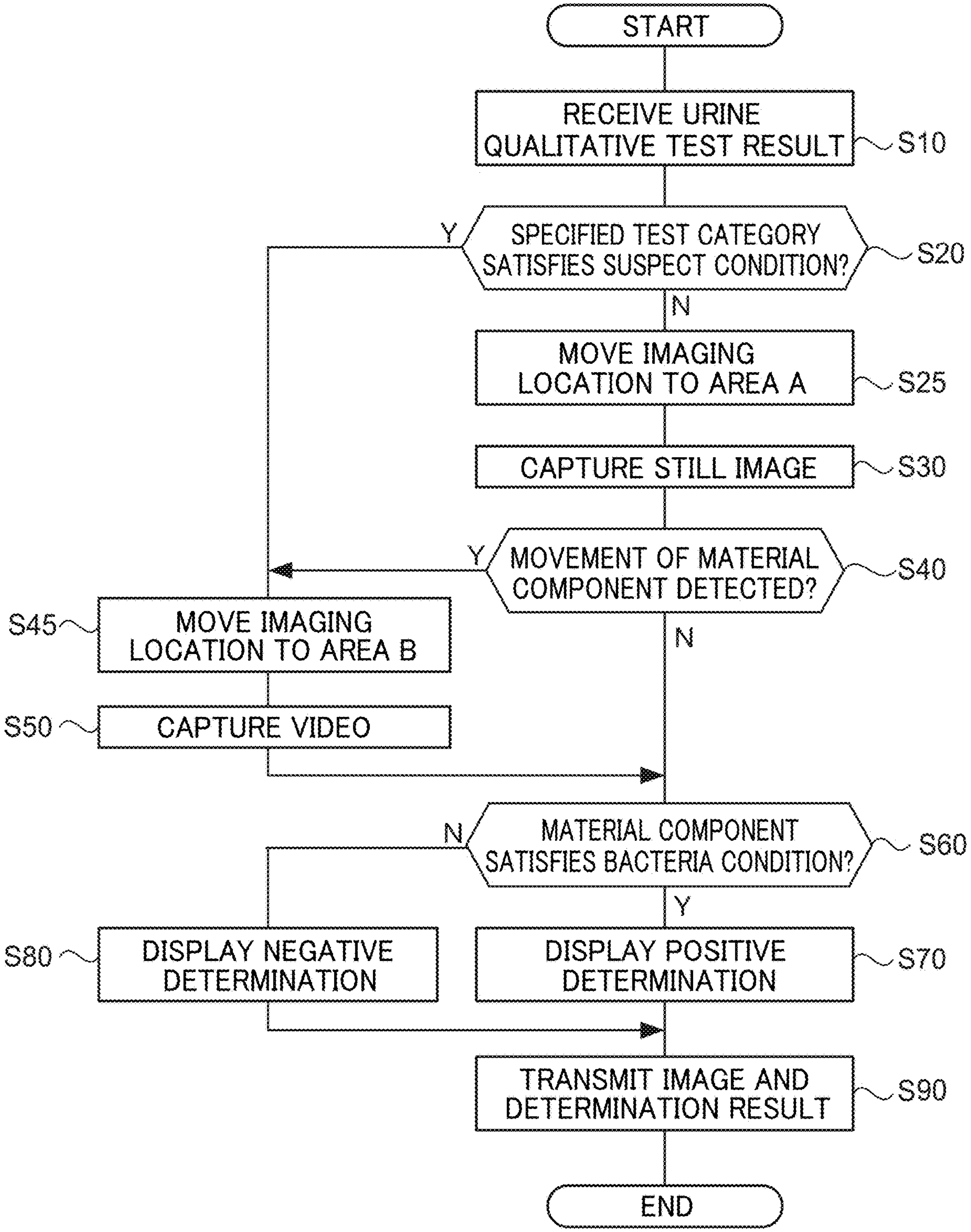
FIG. 11 is a flowchart illustrating an example of a flow of determination processing to determine the presence or absence of bacteria using a step-shaped cell.

Next, description follows regarding the determination processing of the presence or absence of bacteria using the cell 5A. FIG. 11 is a flowchart illustrating an example of a flow of the determination processing of the presence or absence of bacteria using the cell 5A encapsulating a urine sample as executed by the CPU 31 of the urine component analyzer 3 in cases in which a sample ID of a urine sample has been received from the urine qualitative analysis device 1. The CPU 31 of the urine component analyzer 3 reads a control program 36B stored in the storage unit 36 and executes the determination processing illustrated in FIG. 11.

The determination processing illustrated in FIG. 11 differs from the determination processing illustrated in FIG. 7 in the point that a step S25 and a step S45 have been added thereto, and other processing thereof is the same as the determination processing illustrated in FIG. 7. Description accordingly follows of the determination processing illustrated in FIG. 11, concentrating on the processing of step S25 and step S45.

Processing transitions to step S25 when the determination processing of step S20 has determined that the specified test category does not satisfy the suspect condition.

At step S25, the control section 26 controls the actuator 41 to move the plate 6 such that the imaging device 40 captures the material components contained in the area A. The imaging location of the imaging device 40 is moved to the area A by the processing of step S25. The arrow 27A illustrated in FIG. 10 indicates an example of the imaging location of the imaging device 40 after the processing of step S25 has been executed.

At step S30, the control section 26 controls the imaging section 21 so as to capture plural still images of the urine sample contained in the area A as a time series. Namely, at step S40, the detection section 22 uses still images of material components of the urine sample contained in the area A for detecting movements of the material components. The control section 26 stores the captured still images of the urine sample, for example in the storage unit 36.

Processing transitions to step S45 in cases in which the determination processing of step S40 has determined the presence of moving material components among the material components imaged in the area A, and in cases in which the determination processing of step S20 has determined that the specified test category satisfies the suspect condition.

At step S45, the control section 26 controls the actuator 41 to move the plate 6 such that the imaging device 40 captures the material components contained in the area B. The arrow 27B illustrated in FIG. 10 illustrates an example of the imaging location of the imaging device 40 after the processing of step S45 has been executed.

At step S50, the control section 26 controls the imaging section 21, and captures a video of the urine sample contained in the area B. The control section 26 stores the captured video of the urine sample in, for example, the storage unit 36.

In this manner, the urine component analyzer 3 that performs the urinary sediment examination using the cell 5A moves the imaging location of the imaging device 40 to the area A in cases in which still images of the urine sample are to be captured. Moreover, the imaging location of the imaging device 40 is moved to the area B where there are fewer material components present than in the area A in cases in which there is a high probability of the presence of bacteria. Namely, the urine component analyzer 3 detects movement of material components using still images captured in the area A in cases in which the specified test category in the urine qualitative test results does not satisfy the suspect condition, and in cases in which movement of the material component has been detected in the still images, records movement of material components using a video captured in the area B where there are fewer material components present than in the area A.

Note that the method of determination of the presence or absence of bacteria by the urine component analyzer 3 is not only applicable to urine, and may also be used in examination of material components in examination of blood fluid, cells, bodily fluids, or the like. Moreover, microbes other than bacteria can be employed, for example in the determination of the presence or absence of protozoa.

Although embodiments of the urine component analyzer 3 have been described using exemplary embodiments, the disclosed embodiments of the urine component analyzer 3 are merely examples thereof, and embodiments of the urine component analyzer 3 are not limited to the range described in the exemplary embodiments. Various modifications or improvements may be implemented to the exemplary embodiments within a range not departing from the spirit of the present disclosure, and embodiments resulting from such modifications and improvements are contained in the technical scope of the present disclosure. For example, there may be a case where a urine sample to be tested encapsulated in a cell is imaged without performing a urine qualitative test, and in this case, if movement of a material component in the urine sample is detected from plural still images captured as a time series, the image of the urine sample is captured with video by the imaging device and the image of the urine sample captured with video may be stored in a storage device.

For example, the processing sequence of the content of the determination processing illustrated in FIG. 7 and FIG. 11 may be changed within a range not departing from the spirit of the present disclosure.

Moreover, the above exemplary embodiments have been described for embodiments in which, as an example, the determination processing is implemented by software. However, processing similar to that of the flowchart of the determination processing illustrated in FIG. 7 and FIG. 11 may be processing executed by hardware. In such cases an increase in speed of processing can be achieved compared to cases in which the determination processing is implemented by software.

Reference to processor in the above exemplary embodiments indicates a wide definition of processor, and includes general purpose processors (for example the CPU 31), and specialized processors (for example, a graphics processing unit (GPU), an application specific integrated circuit (ASIC), a field programmable gate array (FPGA), a programmable logic device, or the like).

The actions of the processor in the above exemplary embodiment are not limited to being performed by a single processor alone, and may be performed by cooperation between plural processors present in physically distinct locations. Moreover, the sequence of each processor action is not limited only to that described in the above exemplary embodiments, and may be modified as appropriate.

Moreover, the above exemplary embodiments have been described for examples in which the control programs 36A, 36B are pre-stored in the storage unit 36. However, the storage destination of the control programs 36A, 36B is not limited to the storage unit 36. The control programs 36A, 36B of the present disclosure may be provided in a format recorded on a storage medium readable by the computer 30.

For example, the control programs 36A, 36B may be provided in a format recorded on an optical disk, such as a compact disk read only memory (CD-ROM), digital versatile disk read only memory (DVD-ROM), or Blu-ray disk. Moreover, the control programs 36A, 36B may be provided in a format recorded on portable semiconductor memory such as a USB memory or a memory card. The storage unit 36, CD-ROM, DVD-ROM, Blu-ray disk, USB memory, and memory card are all examples of a non-transitory storage medium.

Furthermore, the urine component analyzer 3 may download the control programs 36A, 36B from a file server or the like (omitted in the drawings) connected to the communication line 4 through the communication unit 39, and store the downloaded control programs 36A, 36B in the storage unit 36 of the urine component analyzer 3. In such cases the CPU 31 of the urine component analyzer 3 executes the determination processing by reading, from the storage unit 36, the control programs 36A, 36B downloaded from the file server or the like.

The following supplements related to the present disclosure are disclosed.

Supplement 1

A control method of processing executed by a computer, the processing including:

capturing an image of a urine sample with video using an imaging device and storing the image of the urine sample captured with video in a storage device in cases in which movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images.

Supplement 1.1

The control method of Supplement 1, wherein the processing includes:

capturing an image of a urine sample with video using an imaging device and storing the image of the urine sample captured with video in a storage device in cases in which a result of a predetermined test category in a urine qualitative test satisfies a predetermined condition to suspect bacteria is present in urine, or in cases in which the result of the test category does not satisfy the predetermined condition and movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images captured when the result of the test category has not satisfied the predetermined condition.

Supplement 2

The control method of Supplement 1, wherein the image of the urine sample stored in the storage device is transmitted to an external device through a communication line.

Supplement 3

The control method of Supplement 1, wherein the image of the urine sample stored in the storage device is displayed on a display device.

Supplement 4

The control method of Supplement 1, wherein the test category includes at least one category selected from the group consisting of a nitrite content in urine, a white blood cell content in urine, and a cloudiness level of urine.

Supplement 5

The control method of any one of Supplement 1 to Supplement 4, wherein:

a urine sample is encapsulated in the cell having different thicknesses configured with a thickness along an imaging direction by the imaging device including a first thickness and a second thickness thinner than the first thickness, and an image of the urine sample is captured by the imaging device.

Supplement 6

The control method of Supplement 5, wherein:

an image of the urine sample contained in an area of the cell where the thickness of the cell is the second thickness is captured with video in cases in which the result of the predetermined test category satisfies the predetermined condition; and an image of the urine sample contained in an area of the cell where the thickness of the cell is the first thickness is captured as a still image in cases in which the result of the predetermined test category does not satisfy the predetermined condition, and an image of the urine sample contained in an area of the cell where the thickness of the cell is the second thickness is captured with video in cases in which movement of a material component contained in the urine sample has been detected from the plural still images.

Supplement 7

The control method of Supplement 5 of Supplement 6, wherein:

the urine sample is encapsulated in the cell manufactured such that the second thickness is not greater than ⅕ the first thickness and not less than 100 μm.

Supplement 8

A control program that causes processing to be executed by a computer, the processing including:

capturing an image of a urine sample with video using an imaging device and storing the image of the urine sample captured with video in a storage device in cases in cases in which movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images.

Supplement 8.1

The control program of Supplement 8, wherein the processing includes:

capturing an image of a urine sample with video using an imaging device and storing the image of the urine sample captured with video in a storage device in cases in which a result of a predetermined test category in a urine qualitative test satisfies a predetermined condition to suspect bacteria is present in urine, or in cases in which the result of the test category does not satisfy the predetermined condition and movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images captured when the result of the test category has not satisfied the predetermined condition.

Supplement 9

A non-transitory storage medium stored with a program executable by a computer such that determination processing is executed, the determination processing including a step of:

capturing an image of a urine sample with video using an imaging device and storing the image of the urine sample captured with video in a storage device in cases in which movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images.

Supplement 9.1

The non-transitory storage medium of Supplement 9, the determination processing includes a step of:

capturing an image of a urine sample with video using an imaging device and storing the image of the urine sample captured with video in a storage device in cases in which a result of a predetermined test category in a urine qualitative test satisfies a predetermined condition to suspect bacteria is present in urine, or in cases in which the result of the test category does not satisfy the predetermined condition and movement of a material component contained in the urine sample has been detected from plural still images captured as a time series by the imaging device of a urine sample to be tested encapsulated in a cell; and storing an image of the urine sample captured as a still image in the storage device without capturing an image of the urine sample with video in cases in which a movement of a material component contained in the urine sample has not been detected from the plural still images captured when the result of the test category has not satisfied the predetermined condition.

Supplement 1, Supplement 1.1, Supplement 8, Supplement 8.1, Supplement 9, and Supplement 9.1 exhibit the advantageous effect of enabling a volume of data of images for processing to be curtailed compared to cases in images of the urine sample are captured with video for all urine samples to be investigated for the presence or absence of bacteria.

Supplement 2 exhibits the advantageous effect of enabling determination of the presence or absence of bacteria in a urine sample to be confirmed even at an external device side.

Supplement 3 exhibits the advantageous effect of enabling a determination result of the presence or absence of bacteria in the urine sample to be confirmed retrospectively.

Supplement 4 exhibits the advantageous effect of enabling determination of the presence or absence of bacteria with better accuracy than cases in which determination of the presence or absence of bacteria is based on a test category other than a nitrite content in urine, a white blood cell content in urine, or a cloudiness level of urine.

Supplement 5 exhibits the advantageous effect of enabling selection of capturing an image of the urine sample in an area of the first thickness, or capturing an image of the urine sample in an area of the second thickness, according how the captured image will be used.

Supplement 6 exhibits the advantageous effect of enabling capture of a video of material components having fewer overlaps than capture of a video in an area of the cell of the first thickness.

Supplement 7 exhibits the advantageous effect of enabling a number of material components contained in an area of the cell of the second thickness to be fewer than a number of material components contained in an area of the cell of the first thickness.

What is claimed is:

1. A control method of processing executed by a computer, the processing comprising:

detecting movement of a material component contained in a urine sample from a plurality of still images captured as a time series by a imaging device of the urine sample, selecting between a video capture mode or a still image capture mode based on a result of the detecting movement, capturing an image of the urine sample with video using the imaging device and storing the image of the urine sample captured with video in a storage device in cases in which movement of the material component contained in the urine sample has been detected, wherein the urine sample is encapsulated in a cell; and storing an image of the urine sample captured as a still image in the storage device without capturing an image of the urine sample with video in cases in which a movement of a material component contained in the urine sample has not been detected from the plurality of still images.

2. The control method of claim 1, wherein the processing comprises:

capturing an image of the urine sample with video using an imaging device and storing the image of the urine sample captured with video in the storage device in cases in which a result of a predetermined test category in a urine qualitative test satisfies a predetermined condition to suspect bacteria is present in urine, or in cases in which the result of the test category does not satisfy the predetermined condition and movement of a material component contained in the urine sample has been detected from a plurality of still images captured as a time series by the imaging device of the urine sample to be tested encapsulated in a cell; and storing an image of the urine sample captured as a still image in the storage device without capturing an image of the urine sample with video in cases in which a movement of a material component contained in the urine sample has not been detected from the plurality of still images captured when the result of the test category has not satisfied the predetermined condition.

3. The control method of claim 1, wherein the image of the urine sample stored in the storage device is transmitted to an external device through a communication line.

4. The control method of claim 1, wherein the image of the urine sample stored in the storage device is displayed on a display device.

5. The control method of claim 2, wherein the predetermined test category includes at least one category selected from the group consisting of a nitrite content in urine, a white blood cell content in urine, and a cloudiness level of urine.

6. The control method of claim 1, wherein:

the cell has different thicknesses configured with a thickness along an imaging direction by the imaging device including a first thickness and a second thickness thinner than the first thickness, and the image of the urine sample is captured by the imaging device.

7. The control method of claim 2, wherein:

the cell has different thicknesses configured with a thickness along an imaging direction by the imaging device including a first thickness and a second thickness thinner than the first thickness, and the image of the urine sample is captured by the imaging device.

8. The control method of claim 3, wherein:

the cell has different thicknesses configured with a thickness along an imaging direction by the imaging device including a first thickness and a second thickness thinner than the first thickness, and the image of the urine sample is captured by the imaging device.

9. The control method of claim 4, wherein:

the cell has different thicknesses configured with a thickness along an imaging direction by the imaging device including a first thickness and a second thickness thinner than the first thickness, and the image of the urine sample is captured by the imaging device.

10. The control method of claim 5, wherein:

the cell has different thicknesses configured with a thickness along an imaging direction by the imaging device including a first thickness and a second thickness thinner than the first thickness, and the image of the urine sample is captured by the imaging device.

11. The control method of claim 7, wherein:

the image of the urine sample contained in an area of the cell where the thickness of the cell is the second thickness is captured with video in cases in which the result of the predetermined test category satisfies the predetermined condition; and the image of the urine sample contained in an area of the cell where the thickness of the cell is the first thickness is captured as a still image in cases in which the result of the test category does not satisfy the predetermined condition, and an image of the urine sample contained in an area of the cell where the thickness of the cell is the second thickness is captured with video in cases in which movement of a material component contained in the urine sample has been detected from the plurality of still images.

12. The control method of claim 11, wherein:

the cell is manufactured such that the second thickness is not greater than ⅕ the first thickness and not less than 100 μm.

13. A non-transitory computer-readable storage medium stored with a control program that causes processing to be executed by a computer, the processing comprising:

capturing an image of a urine sample with video using an imaging device and storing the image of the urine sample captured with video in a storage device in cases in which movement of a material component contained in the urine sample has been detected from a plurality of still images captured as a time series by the imaging device, wherein the urine sample is encapsulated in a cell; and storing an image of the urine sample captured as a still image in the storage device without capturing an image of the urine sample with video in cases in which a movement of a material component contained in the urine sample has not been detected from the plurality of still images.

14. The non-transitory computer-readable storage medium of claim 13, wherein the process comprises:

capturing an image of a urine sample with video using an imaging device and storing the image of the urine sample captured with video in a storage device in cases in which a result of a predetermined test category in a urine qualitative test satisfies a predetermined condition to suspect bacteria is present in urine, or in cases in which the result of the test category does not satisfy the predetermined condition and movement of a material component contained in the urine sample has been detected from a plurality of still images captured as a time series by the imaging device of the urine sample to be tested encapsulated in a cell; and storing an image of the urine sample captured as a still image in the storage device without capturing an image of the urine sample with video in cases in which a movement of a material component contained in the urine sample has not been detected from the plurality of still images captured when the result of the test category has not satisfied the predetermined condition.

* * * * *